United States Patent [19]

Volk et al.

[11] Patent Number: 5,333,757
[45] Date of Patent: Aug. 2, 1994

[54] HOIST FOR RETRACTING A LINER FROM A BULK BAG AS MATERIAL IS DISPENSED THEREFROM

[75] Inventors: Benjamin L. Volk; Joseph A. Volk, Jr., both of Creve Coeur; Mark R. Kniepmann, Florissant, all of Mo.

[73] Assignee: Beta Raven Inc., Earth City, Mo.

[21] Appl. No.: 996,672

[22] Filed: Dec. 24, 1992

Related U.S. Application Data

[63] Continuation-in-part of Ser. No. 698,307, May 10, 1991, Pat. No. 5,257,725, which is a continuation-in-part of Ser. No. 629,157, Dec. 18, 1990, Pat. No. 5,141,135.

[51] Int. Cl.$^5$ ............................................. B65D 35/22
[52] U.S. Cl. ........................................ 222/94; 222/105; 222/185
[58] Field of Search ............... 222/181, 185, 94, 105, 222/107; 248/97; 414/608

[56] References Cited

U.S. PATENT DOCUMENTS

| | | |
|---|---|---|
| 3,363,806 | 1/1968 | Blakeslee et al. . |
| 3,372,725 | 3/1968 | Voorhees . |
| 4,000,833 | 1/1977 | Marks . |
| 4,036,411 | 7/1977 | Westhoff . |
| 4,143,796 | 3/1979 | Williamson et al. . |
| 4,194,652 | 3/1980 | Williamson et al. . |
| 4,273,266 | 6/1981 | Snape . |
| 4,332,334 | 6/1982 | Mian . |
| 4,527,716 | 7/1985 | Haas et al. . |
| 4,538,693 | 9/1985 | Klopfenstein et al. . |
| 4,669,950 | 6/1987 | St. Lawrence . |
| 4,810,156 | 3/1989 | Pendleton et al. . |
| 4,863,065 | 9/1989 | Decrane . |
| 4,913,321 | 4/1990 | Abboud . |
| 4,946,071 | 8/1990 | Poulton . |
| 4,966,311 | 10/1990 | Taylor . |
| 5,033,706 | 7/1991 | Poulton . |
| 5,069,596 | 12/1991 | Mueller et al. . |
| 5,141,135 | 8/1992 | Volk, Jr. .................. 222/181 |
| 5,148,943 | 9/1992 | Moller . |
| 5,154,326 | 10/1992 | Chang et al. . |
| 5,160,016 | 11/1992 | Moksnes . |
| 5,184,759 | 2/1993 | Gill et al. .................. 222/181 |

FOREIGN PATENT DOCUMENTS

| | | | |
|---|---|---|---|
| 109191 | 5/1984 | European Pat. Off. ........... 414/608 |
| 668850 | 6/1979 | U.S.S.R. ......................... 222/203 |
| 742307 | 7/1980 | U.S.S.R. ......................... 222/203 |
| 623793 | 4/1982 | U.S.S.R. ......................... 222/203 |
| 2084968 | 4/1982 | United Kingdom ............... 222/198 |

Primary Examiner—Gregory L. Huson
Attorney, Agent, or Firm—Rogers, Howell & Haferkamp

[57] ABSTRACT

A liner hoist for a bulk bag in a first embodiment includes a rope and hook for pulling up and tying the liner to prevent its fouling the discharge of material through a bottom pour spout. In a second embodiment, it retracts a liner upwardly from within a bulk bag as dry material is dispensed out the lower end thereof through a pour spout. The second embodiment includes a hook for hooking an eyelet fashioned in the upper end of the liner, a rope attached to the hook and supported by a plurality of pulleys from the bulk bag support framework, a spring extending between the rope and the framework, and cleat through which the rope is threaded to prevent the rope from retracting after the spring is tensioned. In operation, as the liner empties and tends to elongate, the hook lifts the liner from within the bulk bag through the action of the spring, all without operator intervention.

18 Claims, 4 Drawing Sheets

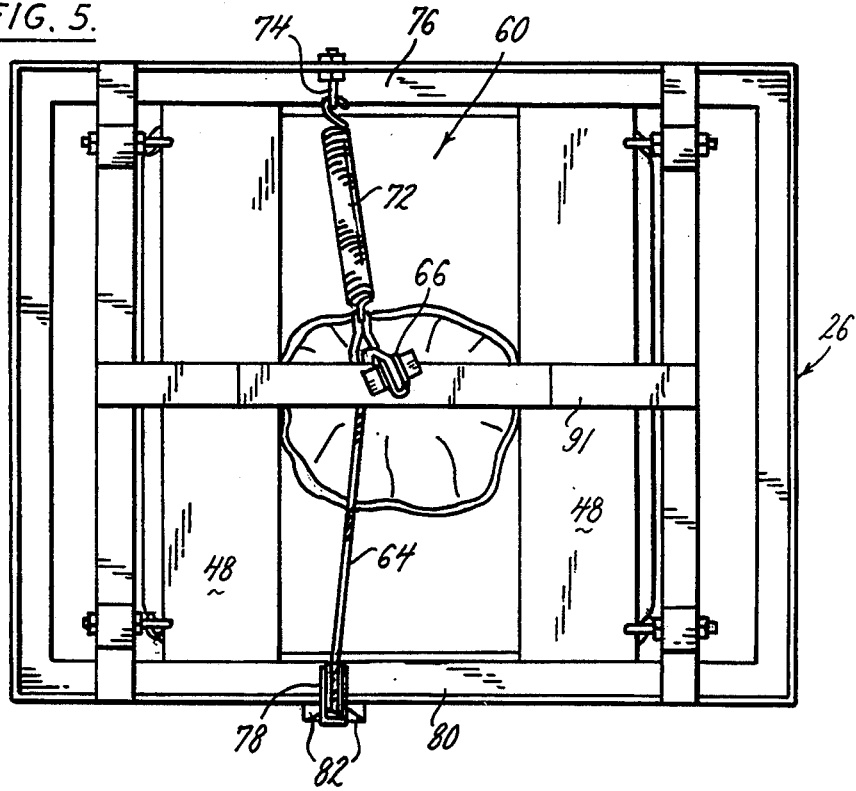
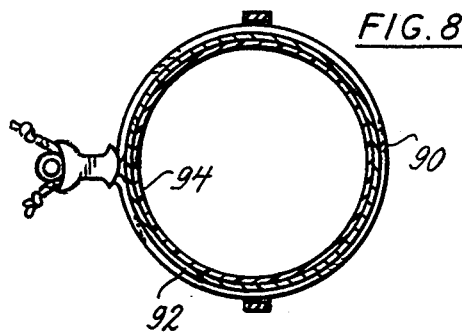
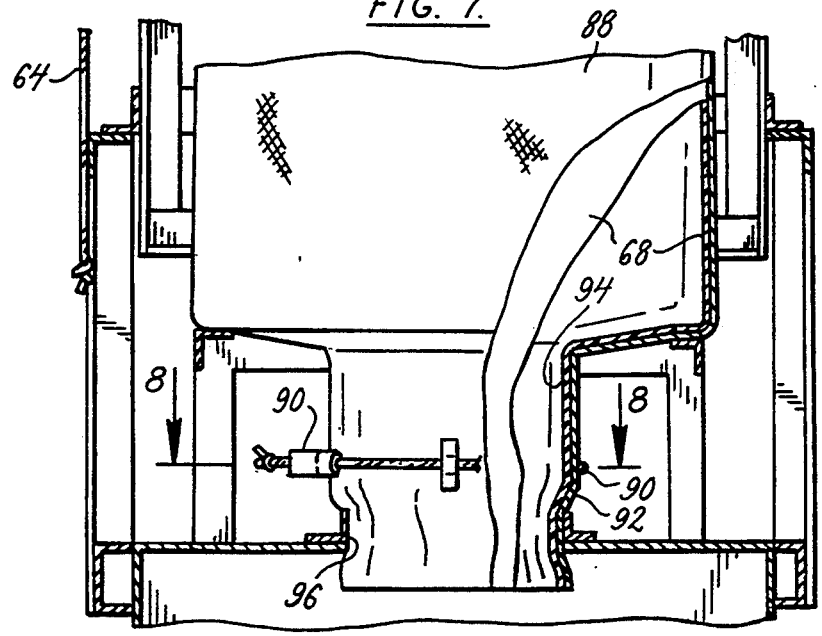

HOIST FOR RETRACTING A LINER FROM A BULK BAG AS MATERIAL IS DISPENSED THEREFROM

CROSS-REFERENCE TO RELATED APPLICATIONS

This is a continuation-in-part of pending application Ser. No. 07/698,307 filed May 10, 1991, now U.S. Pat. No. 5,257,725 issued Nov. 2, 1993 which is a continuation-in-part of Ser. No. 07/629,157, filed Dec. 18, 1980 U.S. Pat. No. 5,141,135 issued Aug. 25, 1992. This application is also related to an application entitled "Batch Weighing Apparatus With Bulk Bag Type Bins" having Ser. No. 07/699,988 filed May 10, 1991.

BACKGROUND AND SUMMARY OF THE INVENTION

In the prior art, bulk dry material was typically shipped in many different kinds of containers and then those containers were discarded after the bulk material was received by the end user and loaded into other bulk storage facilities including bins or the like. For many reasons including cost, soft-sided, high strength, multiple layer bags utilizing liners have been recently developed and are gaining in popularity for the shipment and handling of significant quantities of bulk dry material. The inventors herein are aware of uses in the food industry where the dry material contained in the bag typically approaches 3,000 lbs., with a bag standing 3–4 feet in height with a square base between 2–3 feet on a side. For shipment, these bulk bags are typically skid mounted so that a forklift may conveniently be used to handle the bag by lifting the skid and moving the bag as desired. Strap-like lifting handles are typically provided at the four corners at the top of the bag, but the inventors are unaware of any prior art use for these handles other than to facilitate grasping of the bag by several men for manually adjusting the position of the bag on the skid or the floor. These lifting straps are sufficiently sturdy to permit lifting of the bag and its contents thereby, and it is presumed by the inventors that overhead cranes or fork lifts or the like may be used in some installations for transporting the bags and/or contents within a plant or other facility.

Typically, at least in one application, these bulk bags have a pour spout integrally formed therein and located near the center bottom of the bag such that the bag may be positioned off the floor and on some type of weighing, batching, or mixing apparatus for dispensing of the dry material directly from the bulk bag. For these applications, it is typically required to lift the bulk bag and its contents from the floor or other storage facility, up and onto the particular piece of equipment being utilized to dispense the dry material. For these applications, it is particularly difficult for a forklift truck to lift the bulk bag and put it in place on the machine. Typically, as might be expected, the underlying skid cannot be used as it would block the bottom pour spout of the bag. Therefore, as best known to the inventors, the forklift operator typically scoops the bulk bag off the skid by placing the forklift blade beneath the bulk bag and the skid. This involves considerable risk of tearing of the bag or otherwise damaging the bag and thereby ruining it for its intended purpose. Additionally, these bulk bags can be quite unsafe when lifted to any appreciable height as the bag typically leans to one side and is unsteady, and the contents thereof may readily shift as the bag is lifted. Furthermore, movement of the bag tends to cause the contents to shift in an unpredictable manner such that the bag is not strictly aligned. For some equipment, this makes it difficult for a forklift truck operator to place the bag properly as limited space may be provided therefore in the equipment.

In order to facilitate the support and lifting of the soft-sided bulk bags by forklift trucks, one of the inventors herein has previously succeeded in designing and developing a bird cage-like framework which may be set over the top of a bulk bag to surround it, with the framework having four hook-like strap supports located at its corners to which the bulk bag's straps may be affixed. Additionally, a pair of rails comprised of inverted U-brackets extend along the top of the framework from the front to back thereof to provide a convenient structure to receive the blades of a forklift truck so that the framework may be conveniently handled thereby. Additionally, a bracket lip may be formed by a set of horizontally extending brackets surrounding the outside of the framework and immediately above the ground such that the framework may be lifted and placed onto a receiving bracket lip mounted to the user's equipment so that the framework may be used not only to support and lift the bulk bag and its contents, but also to mount it to a bulk storage and dispensing machine such as a batch weighing apparatus or the like.

As can be appreciated, many of the problems in the prior art have been solved by the framework invention. For example, the forklift blades need not be shoved between the bottom of the bag and the skid which thereby eliminates risk of damage to the bottom of the bag and pour spout. As the bag is lifted by handling the framework, minimal physical contact is made with the bag which further reduces accidental tearing, or other damage to the bag caused by shifting of the contents thereof. Lifting the framework from the top causes the bag to "sag" to the center of the framework and forces the straps to support the bag relatively evenly to thereby facilitate placement of the bag and framework on a user's piece of equipment. By placing the bag on a skid whose dimensions are smaller than the framework, the bag may be easily secured to the framework, lifted off the skid, and thus be suspended off the ground by the framework for easy placement on other equipment. Furthermore, the outer dimensions of the framework define an envelope required on the equipment for placement of the bag and which the user may rely on from bag to bag regardless of the shifting contents thereof or tilting of the bag on the forklift as is experienced in the prior art.

In using the framework invention for suspending bulk bags and rack mounting them on a batch weighing device for direct dispensing of material from within the bulk bag, the inventors have found that the interior liner of the bag has a tendency to interfere with flow of the material. As the material is dispensed from the bag, the interior liner has a tendency to elongate and collect at the bottom thereof at which point it clogs the pour spout or bulk bag discharge opening at the bottom thereof. Elongation of the bag is essentially caused by three things. First, the diameter of the liner decreases as material is dispensed from within the liner, thereby causing the liner to elongate. Secondly, the liner is generally made from flexible materials which have a tendency to stretch, especially when loaded with a bulk of dry material. Thirdly, there is a natural tendency for the liner to drop down into the pour spout or bulk bag discharge opening because of gravity and the movement of material which creates frictional forces having a tendency to pull the liner towards the bottom of the bag. For these reasons, additional attention by an operator has to be given to the bulk bags after they have been rack mounted in order to ensure that the discharge openings are clear and free flowing. Thus, while the bulk bag support framework previously developed has provided a marked improvement over the prior art, the inventors have worked towards eliminating this last bit of operator involvement so that the bulk bags might conveniently be used in place of rigid walled storage bins.

In actual usage, if a liner would hinder or block a discharge opening, an operator would typically be forced to cut through the sidewall of the bulk bag in order to free the liner and clear the discharge opening for continued free flow of material. However, cutting the bulk bag eliminates its potential reuse through reinserting a new liner in the bulk bag and refilling it as is customarily done in the prior art. Thus, there is a cost savings which can be achieved if the liners can be prevented from migrating into the discharge opening, thereby eliminating the need to cut open the sidewall of the bulk bag and thereby eliminate its reuse.

In order to further enhance the prior invention of the bulk bag support framework, and to solve the additional problems noted herein, the inventors herein have succeeded in designing and developing a liner hoist which is elegantly simple and which serves to either secure the liner in place or automatically retract the liner upwardly out of the bulk bag and away from the discharge opening and pour spout at the bottom thereof as material is emptied from within the liner. The liner hoist of the present invention includes in a first embodiment a rope with a hook attached at an end for insertion through an eyelet formed from the upper end of the liner. In a second embodiment, the invention further includes a plurality of pulleys for supporting the rope from the bulk bag support framework, a cleat for releasably securing the rope at a fixed length, and a spring extending between the rope and the framework.

In operation, the upper end of the bulk bag liner is twisted into a rope-like length, doubled over to form a loop, and then secured by a plastic tie wrap or the like to form an eyelet. The hook of the liner hoist is hooked into the eyelet and the rope is then tied off directly above the bag and to the framework. As the rope is tied off, it is pulled tight and has been found to adequately retain the liner in place as material is dispensed. With the second embodiment, instead of tying, the rope is pulled tight around the pulleys to tension the spring, the rope sliding through the cleat so that upon reaching spring tension, the rope may merely be released and then be held in place by the cleat. Then, as material is discharged from the bulk bag and the liner elongates, the mechanical force of the spring in combination with a pulley, which provides a two to one mechanical advantage, pulls the rope to lift the hook and eyelet and withdraw the liner from within the bulk bag. With the liner hoist of the second embodiment, the liner is withdrawn from the bulk bag as it elongates to thereby prevent its interference at the bottom of the bag with the discharge opening and pour spout. The second embodiment thus actively withdraws the liner from within the bag and is preferred over the first embodiment.

While the principal advantages and features of the present invention have been described above, a more complete understanding thereof may be attained by referring to the drawings and description of the preferred embodiment which follow.

BRIEF DESCRIPTION OF THE DRAWINGS

FIG. 5 is a plan view of the bulk bag support framework depicting both embodiments of the liner hoist secured to a liner;

FIG. 7 is a partial cross-sectional view of the bottom of the bulk bag and liner detailing its mounting to a receiving manifold;

FIG. 8 is a partial cross-sectional view taken along the plane of line 8—8 in FIG. 7 and detailing the rope pull fastener for closing the bottom of the bulk bag;

FIG. 9 is a partial cross-sectional view taken along the plane of line 9—9 in FIG. 6 and detailing the pulley located near the top of the bulk bag support framework;

DETAILED DESCRIPTION OF THE PREFERRED EMBODIMENT

Figure 1:
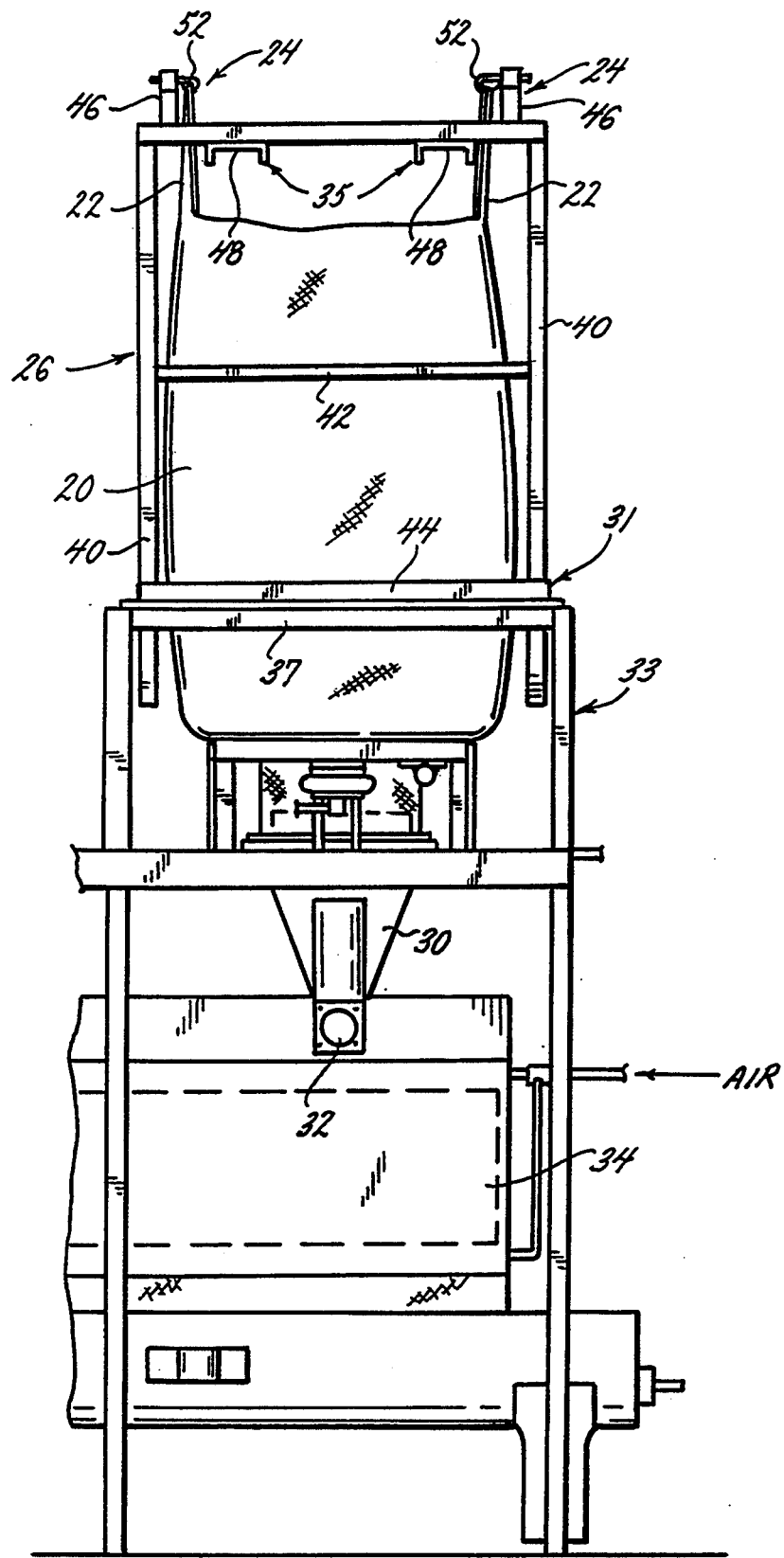
FIG. 1 is a partial front view of a typical batch weighing machine which has been adapted for receiving the bulk bag framework of the present invention.

As shown in FIG. 1, a bulk bag 20 may be supported by its plurality of loop-type straps 22 which are looped into hook members 24 to thereby support the bulk bag 20 from the support framework 26 of the present invention. A bracket lip 31 extending generally horizontally around the framework 26 permits the framework 26 to be rested directly on a bulk weighing apparatus 33 or the like as shown therein for directly dispensing the bulk dry material contained within bulk bag 20 through a pour spout (not shown) and into a trough 30 with an auger 32 connected thereto for measuring the dry material into a weigh trough 34. Also included on the framework 26 are a pair of lifting rails 35 which extend above the top of the bag 20 and from near the front of the framework 26 to the rear thereof to provide a convenient place for lifting of the framework 26 by the blades of a forklift truck (not shown). Thus, the bulk bag 20 may be lifted off the floor and placed into position on the bulk weighing apparatus 33 in a convenient manner and without interference with other supporting apparatus. The framework 26 is merely lowered down into place where bracket lip 31 contacts a corresponding supporting member 37 on batch weighing apparatus 33 to thereby support bulk bag 20 and its contents as well as the framework 26.

Figure 2:
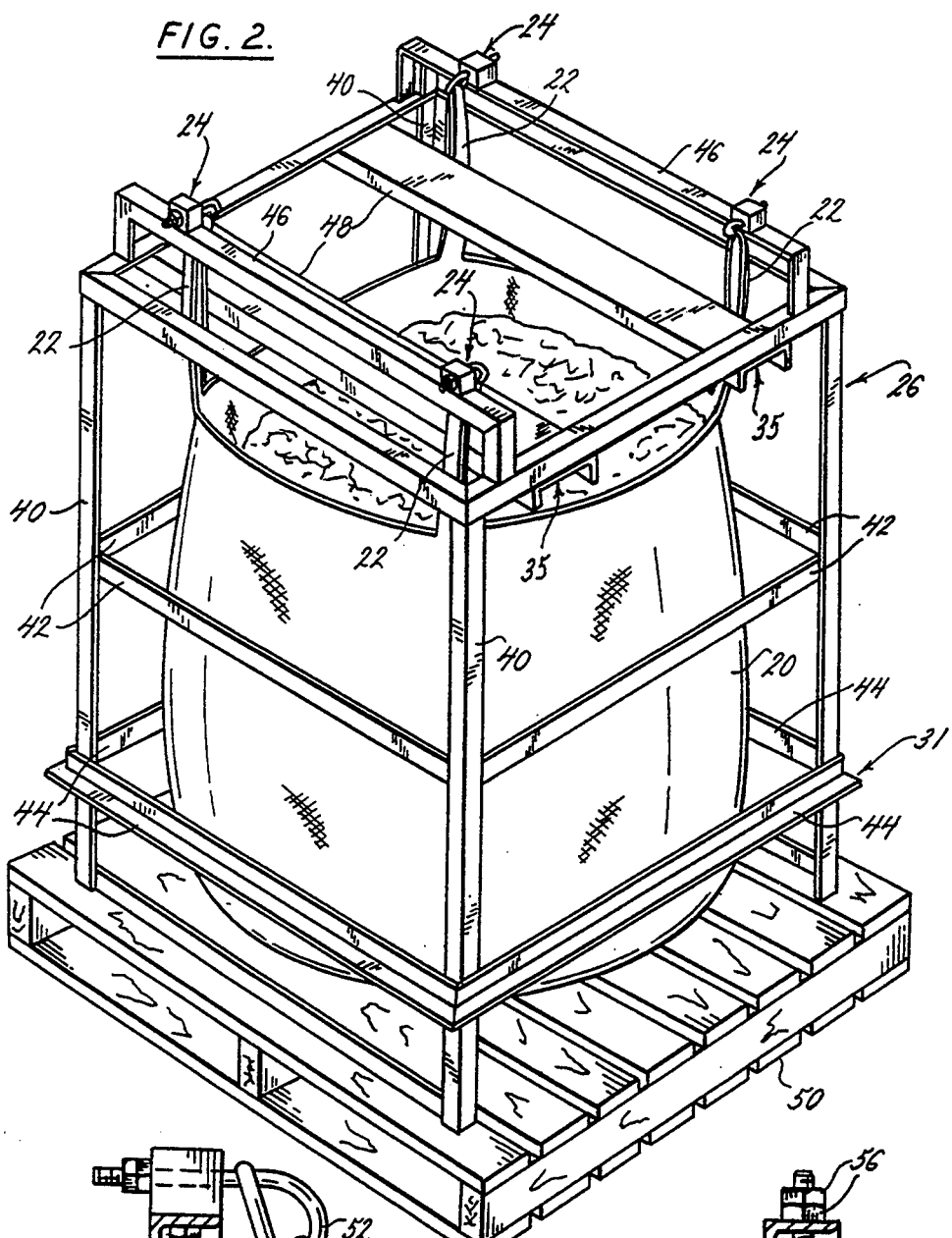
FIG. 2 is a perspective view of a skid mounted bulk bag with the framework of the present invention installed over the bag and attached thereto.
Figure 3:
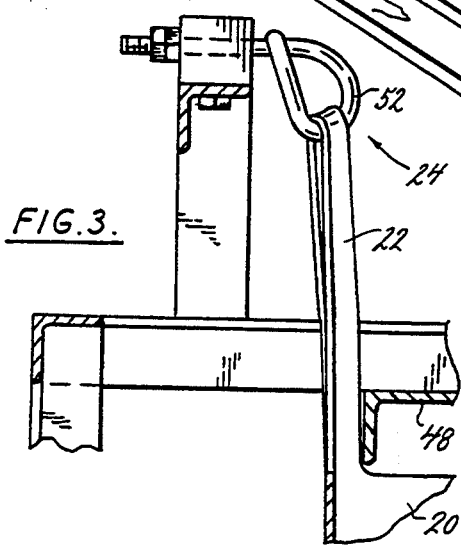
FIG. 3 is a partial cross-sectional view taken along the plane of line 3—3 in FIG. 2 and detailing the hook member used to secure the bag straps to the framework.
Figure 4:
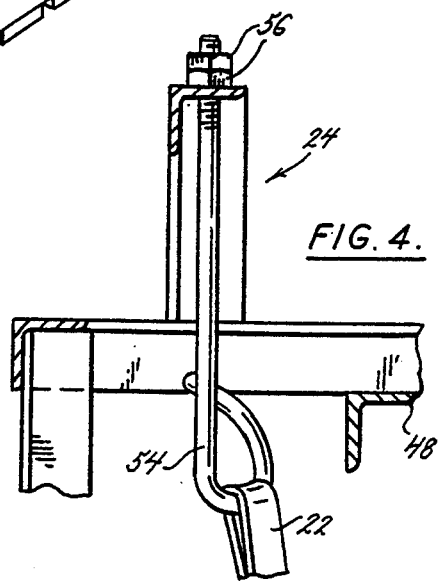
FIG. 4 is a partial cross-sectional view detailing an alternate embodiment for the framework hook members.

As shown in FIGS. 2–4, the supporting framework 26 includes four vertically oriented, upstanding posts 40 located at the four corners of the framework 26, said posts 40 being interconnected and supported by a plurality of generally horizontally extending bracket members 42. Additionally, a generally horizontally extending bracket lip 37 is comprised of a plurality of generally L-shaped bracket members 44 which also extend between and interconnect posts 40, except that they are on the outside thereof. At the top of supporting framework 26, a pair of upper bracket rails 46 extend from near the front of the framework 26 to the rear thereof and provide the mounting locations for four hook members 24 which are pivotally secured thereto. Hook members 24 are shown in greater detail in FIGS. 3 and 4. A pair of generally U-shaped rails 48 also extend from near the front of the framework 26 to the rear thereof and provide a convenient structure for receiving the blades of a forklift truck (not shown) which may be used to lift the framework 26 and bag as a unit. The loop-type straps 22 are all secured to the framework 26 by being looped into the hook members 24 which provides the sole attachment between framework 26 and bag 20. Thus, as the framework 26 is lifted, the bag 20 and its contents settle uniformly between the posts 40 of framework 26. Bag 20 is shown in FIG. 2 as resting on a skid 50 which is typically how bulk bags 20 are shipped. Thus, framework 26 may be conveniently lifted over the top of the bulk bag 20 and the straps 22 secured to hook members 24 quickly and conveniently to secure them together.

Although the framework 26 is depicted in FIG. 2 as resting directly on skid 50, skid 50 is typically smaller than shown therein such that the framework 26 rests instead on the floor. With this arrangement, it is much more convenient to attach the loop-type straps 22 to the hook members 24 as the hook members 24 may be loosened to a greater degree. After the bag 20 is secured to the framework 26, the framework 26 and bag 20 may then be lifted from off the skid and the framework replaced on the floor such that the bag 20 is supported above the floor. Thus, after the bag 20 has been secured to the framework 26 it is totally enclosed within the envelope defined by the framework 26, including the lower surface thereof. This makes it much more convenient for placing of the bag 20 and framework 26 on a piece of equipment. Also, the framework 26 may thus be used to store the bag 20 and its contents above floor level without being directly in contact with the floor along its lower surface as when the bag 20 is supported by the skid 50.

As shown in FIG. 3 and 4, two different variations of hook member 24 may be provided. As shown in FIG. 3, hook member 24 comprises a somewhat shorter and generally horizontally extending hook 52 which is pivotally attached such that the hook 52 may be rotated to assist in securing the strap 22 thereto. Alternately, as shown in FIG. 4, a generally vertically extending hook 54 may be provided which may be first looped through the strap 22 and then secured in a fixed orientation in a double-nut configuration 56. Generally, better results have been experienced with the embodiment shown in FIG. 3, although both embodiments will work.

Figure 6:
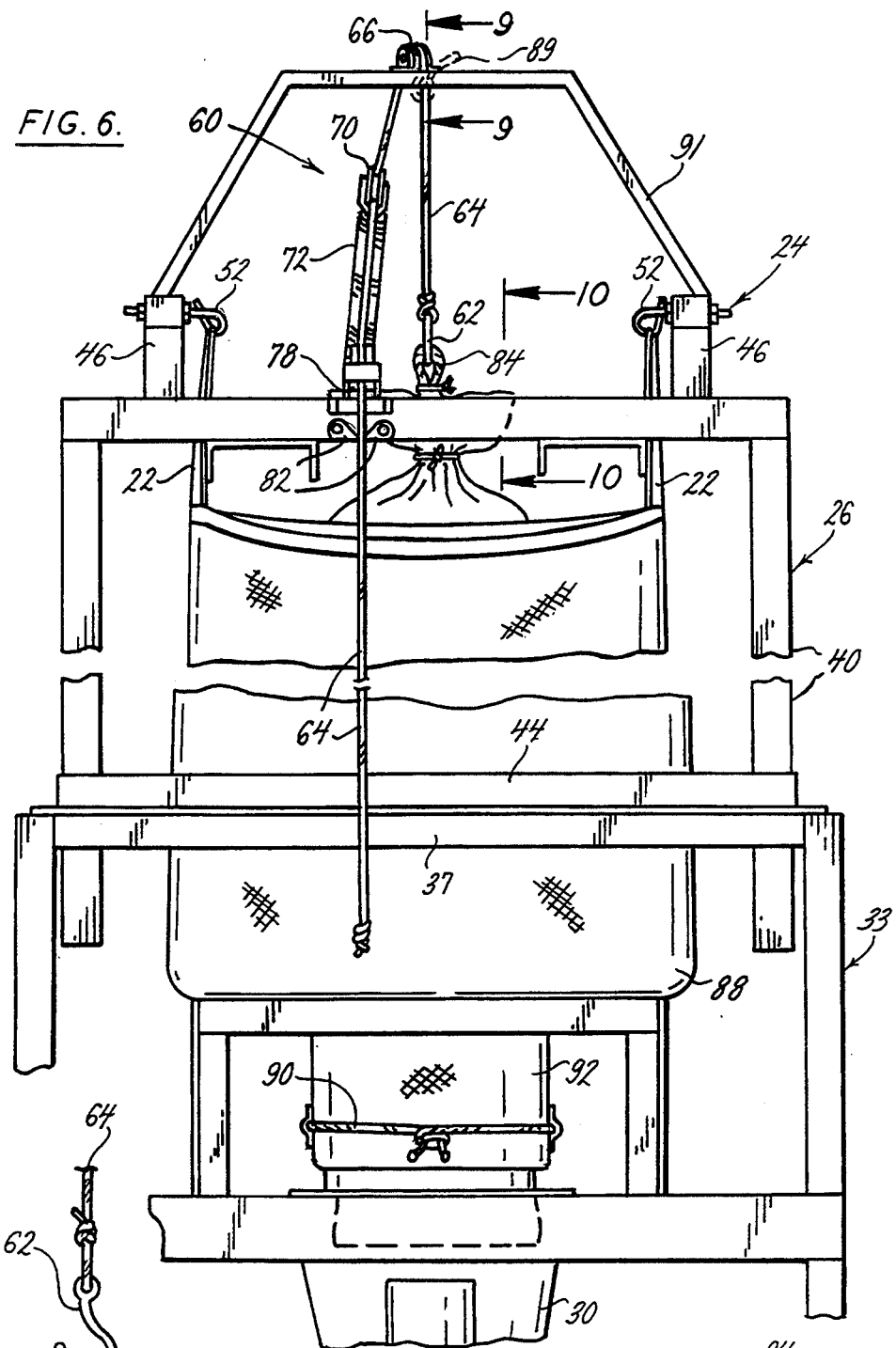
FIG. 6 is an elevational view of a bulk bag support framework supporting a bulk bag and liner from a batch weighing device with the liner hoist secured to the liner.
Figure 10:
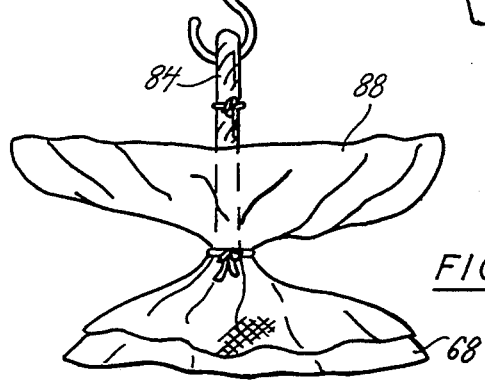
FIG. 10 is a partial side view detailing the hook inserted through the loop of the liner.
Figure 11:
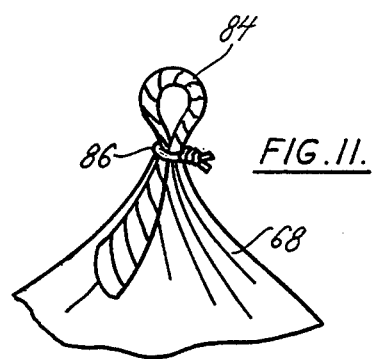
FIG. 11 is a partial view of the top of the liner further detailing the eyelet formed therein.

As shown in FIGS. 5 and 6, the second embodiment of the liner hoist 60 of the present invention generally includes a hook 62 secured at an end of a rope 64 which is threaded over a first pulley 66 mounted directly above and centrally located to the liner 68. A second pulley 70 is mounted to an end of a spring 72 which has its other end attached with a hook and eyelet 74 to a side bracket 76. Lastly, the rope 64 is threaded through a third pulley 78 mounted to a side bracket 80 directly opposite from side bracket 76, and thence through a cleat 82, the rope having enough additional length to hang down far enough for an operator to conveniently reach it from floor level. The hook 62 of the liner hoist 60 is hooked through an eyelet 84, best shown in FIGS. 10 and 11 which is formed by having the liner twisted into a ropelike extension and then doubled over on itself into a loop shape, after which it is secured by plastic tie wrap 86 or the like. The liner 68 is itself contained within bulk bag 88, as is well known in the art.

As shown in FIG. 6, the first embodiment of the liner hoist 60 may simply include the hook 62 secured to rope 64 and tied in a knot 89 to cross member 91 located immediately above the liner 68. The rope 64 is pulled tight prior to tying to provide maximum advantage. As previously mentioned, this embodiment has been found to adequately prevent the liner 68 from fouling the discharge of material, although the second embodiment is considered more desirable.

As shown in FIGS. 7 and 8, a rope lock 90 is conveniently mounted around the pour spout 92 of bulk bag 88 and seals it closed during shipping and the like. The pour spout 94 of liner 68 is pulled from within the bulk bag and threaded down through bag pour spout 92 after the bulk bag is positioned atop the batch weighing device. Both pour spouts 92, 94 are friction fit within a manifold opening 96 where the dry material contained within the bulk bag and liner 88, 68 is then emptied on command.

In operation, the hook is inserted through the eyelet of the liner, and the rope is pulled downwardly by an operator to thereby tension the spring as it is guided by the pulleys, with the cleat permitting downward travel of the rope. After the operator has tensioned the spring to an appropriate amount, the operator need merely release the rope and the cleat prevents the rope from retracting upwardly and thereby "sets" the liner hoist for operation. It is noted that the pulleys have been placed in order to prevent the rope from fouling as it is tracked along the top of the bulk bag support framework, and also to prevent interference with the forklift channels. As the liner elongates during dispensing of material from the bulk bag, the spring retracts the rope to thereby lift the hook and eyelet and withdraw the liner from within the bulk bag and prevent its interfering or blocking the downward flow of material through the pour spout. After the bulk bag and liner have been completely emptied, the bulk bag support framework may be removed from the batch weighing device by a forklift or the like, set onto the plant floor, and the empty bag removed. The bulk bag support framework with liner hoist is then ready for the mounting of another, full bulk bag and liner.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. A hoist for suspending a liner, said liner containing a quantity of dry material within a bulk bag, said liner having a pour spout at its bottom through which said dry material is dispensed, said hoist comprising a hook for supporting an upper end of said liner as said bulk bag is supported, and means for biasing said hook upwardly so that said liner is prevented from interfering with said dispensing of dry material through said pour spout.

2. The hoist of claim 1 wherein said bulk bag is supported from a support, and said biasing means includes a rope secured to said hook and to said support.

3. The hoist of claim 2 wherein said biasing means includes a tensioner extending between said rope and said bulk bag support.

4. The hoist of claim 3 wherein said hoist further comprises a clamp mounted on said bulk bag support, said clamp having means for securing said rope to thereby secure said rope to said bulk bag support.

5. The hoist of claim 4 wherein said clamp is a cleat.

6. The hoist of claim 5 further comprising at least one pulley for supporting said rope from said bulk bag support.

7. The hoist of claim 6 wherein said pulley is mounted to said bulk bag support at a point above said liner.

8. The hoist of claim 7 further comprising a plurality of pulleys for supporting said rope from said bulk bag support.

9. A hoist for supporting a liner from within a bulk bag, said liner containing a quantity of dry material and having a pour spout in its bottom through which said dry material is dispensed, said hoist comprising a hook for supporting an upper end of said liner as said bulk bag is supported from a support, a rope extending between said hook and a clamp mounted on said support, and a spring extending between said rope and said support for tensioning said liner to thereby prevent its interfering with said dry material as it is dispensed through said pour spout.

10. The hoist of claim 9 further comprising at least one pulley, said pulley being mounted to said bulk bag support and positioned to support said rope therefrom at a point above said liner.

11. The hoist of claim 10 wherein said clamp has means for releasing said rope therefrom.

12. The hoist of claim 11 wherein said clamp is a cleat.

13. The hoist of claim 12 wherein said liner has a loop formed therein at its top, said hook being adapted to support said liner from said loop.

14. A hoist for supporting a liner from within a bulk bag, said liner containing a quantity of dry material and having a pour spout in its bottom through which said dry material is dispensed, said hoist comprising means for attaching said hoist to the top of said liner and means for retracting said liner up and out of said bulk bag as said liner is emptied, said bulk bag having a separate means for support from a bulk bag support.

15. The hoist of claim 14 wherein said retracting means includes a rope extending between said attaching means and said bulk bag support, and a spring extending between said rope and said bulk bag support.

16. The hoist of claim 15 further comprising at least one pulley, said pulley being mounted to said bulk bag support and positioned to support said rope therefrom at a point above said liner.

17. The hoist of claim 16 further comprising a clamp mounted on said bulk bag support, said clamp having means for receiving and holding said rope.

18. The hoist of claim 17 wherein said clamp is a cleat.

* * * * *